Figure 1:
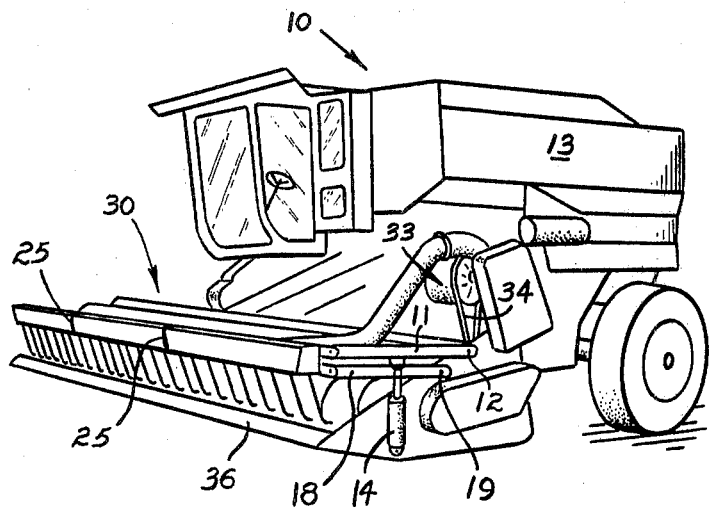
Figure 2:
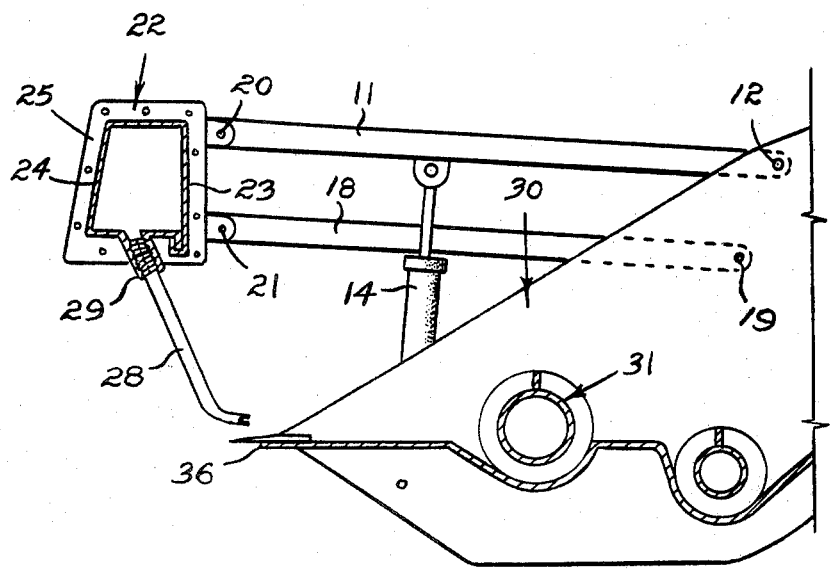

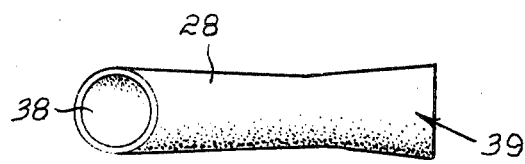
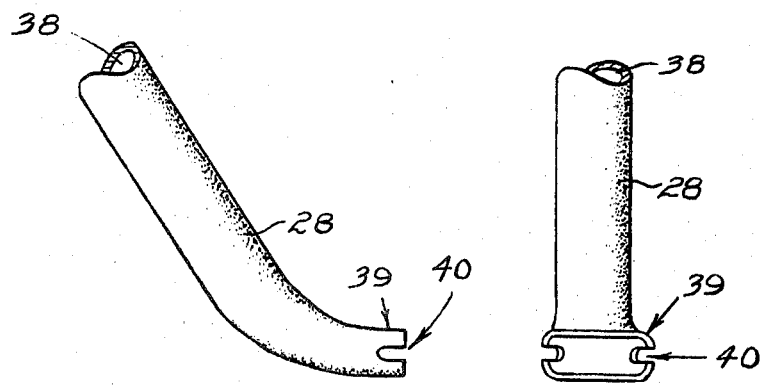

PRESSURE AIR MANIFOLD AND OUTLETS SYSTEM FOR GRAIN HEADER OR HARVESTER CUTTING PLATFORMS

This invention relates to an improved pressure air manifold and outlets system for a grain header or harvester cutting platform, of the type having a frame, a cutter bar assembly and a feed auger.

BACKGROUND OF THE INVENTION

It has been known for many years that if a grain harvester or header cutting platform is fitted with a low pressure centrifugal blower or compressor and manifold, having a number of outlet tubes the openings of which face rearwardly and are situated forwardly of the cutter bar assembly, the cut crop can be assisted in its movement over the cutting platform and into the feed auger at the rear end thereof. This arrangement is intended to eliminate the need for a reel on "open" machines or the knife auger or flail on "closed" front headers, but the system has not come into use because of the difficulty of satisfactorily transporting the cut crop to the main throat of the machine for further processing.

Another difficulty which has been encountered has been a very considerable loss which has been occasioned on prior art machines wherein the air discharge tubes are positioned forwardly of the cutter bar assembly, due to "shatter" of the crop if harvested under dry conditions. For example, in the U.S. Pat. No. 2,670,586 (C. M. Phillips) there is described and illustrated a pneumatic attachment having pipes which depend from a manifold and terminate at their lower ends in fan shaped air nozzles. These are located forwardly of a cutter bar assembly, and in use under very dry conditions would so interfere with a standing crop as to cause considerable loss due to "tailing in" by forcing the crop to go under the fan shaped nozzle and to "shatter". However it is deemed desirable to harvest crops under dry conditions to ensure a low moisture content of the grain, and at the time of writing this specification, official figures in Australia indicate an average loss of about $8.00 per acre (about $20.00 per hectare) in certain type crops due to the crop being shattered and/or lost over the front end of the cutting platform, even without the use of such devices in front of the cutter bar assembly. This loss is still further increased if there are relativly large obstructions to the crop forward of the cutter bar assembly, for example, as illustrated in said U.S. Pat. No. 2,670,586, and much of the shattered "tailed in" or lost crop is wasted by not passing through the harvester or header machine.

The main object of this invention therefore is to provide an improved system wherein use is made of an air manifold and outlet relatively narrow tubes extending therefrom, arranged and shaped in such a way as to assist the cutting and transporting of the headed crop across the cutting platform of a grain header or harvester so effectively that the need is abolished for use of a reel, and the loss due to shattering of the crop or of grain heads falling over the front of the cutting platform is substantially reduced.

BRIEF SUMMARY OF THE INVENTION

Briefly in this invention a pressure air manifold and outlets system for a grain header or harvester utilises a manifold which extends across and above a cutting platform of the machine, the manifold being adjustable for height, and being provided with a plurality of outlet tubes which depend from the manifold and which terminate nominally above the cutter bar assembly each shaped outlet tube spouts being directed to discharge in a rearward and part lateral direction, and a blower to impart an air flow through the manifold to discharge through the outlet tubes.

With this arrangement, the crop is severed by the cutter bar as it is being subject to the air blast from the shaped outlet tubes, and any shattering of the crop due to the action of the cutter bar assembly will not result in such a heavy loss as occasioned by previously known machines, some at least of the shattered heads being entrained in the air flow. Particularly if the air blast is at high velocity, some of the air in front of the manifold and outlets systems will be entrained with the airblast and it has been found that the crop is much more effectively cut and transported with much less loss than with previously proposed machines.

Another of the problems which has been encountered heretofore has been the loss due to the cut crop being directed solely in a rearward direction without any assistance in change of direction, and some of the particulate portions of the headed crop will bounce off the hard surfaces of the cutter platform and be lost, and to still further improve the efficiency of the device, in one embodiment the outlet tubes are so arranged that the air being discharged therefrom has a lateral component of movement directing the headed crop at least partially in a lateral direction which assists the action of the feed auger and is found to avoid bunching and thinning. It also results in a much smoother flow of crop through the remainder of the grain header or harvester, and thereby more efficient threshing.

Experiments have indicated that one of the problems encountered with previously proposed pneumatic attachments has been the relatively low velocity of the air streams issuing from the outlet tubes coupled with an interrupted or fluctuating air curtain across the knife has been insufficient to ensure effective transport of the headed grain, and in one embodiment of the invention, air is discharged at a pressure of at least twelve inches or 300 mm water gauge (at about 40 m per second), and preferably at more than 400 mm pressure gauge (170 feet per second or 50 m per second).

More specifically, in this invention, an improved pressure air manifold and outlet system for a grain header or harvester cutting platform having a frame, a cutter bar assembly and a feed auger, comprises:

a pair of support arms projecting forward, one from each end of the cutting platform, a manifold extending across and above the cutting platform, pivot means joining the front ends of said arms to said manifold and the rear ends of said arms to said header frame, and elevating means coupling at least one of said arms to said header frame, a plurality of outlet tubes depending from said manifold and terminating nominally above said cutter bar assembly, each said shaped outlet tube spout being directed to discharge in a rearward direction and also in a lateral direction to collectively form a continuous air curtain, and a blower, drive means coupled to the blower, and conduit means coupling said blower to said manifold such that upon blower operation said outlet tubes discharge air rearwardly and laterally over the cutting platform towards the auger.

1. Improved pressure air manifold and outlets system for grain header or harvester cutting platform having a frame, a cutter bar assembly and a feed auger, comprising
    a manifold extending across and above the cutting platform,
    mounting means mounting the manifold to the frame,
    a plurality of outlet tubes depending from said manifold, each said outlet tube terminating in outlet means at its end above said cutter bar assembly and adjacent to the front edge thereof, each said outlet tube being directed to discharge in a generally rearward and lateral direction, and
    a blower, drive means coupled to the blower, and conduit means coupling said blower to said manifold
    and outlet means for providing a continuous curtain of air substantially across the cutting platform.

2. Improved system according to claim 1 wherein said mounting means comprise a pair of support arms projecting forward, one from each end of the cutting platform,
    pivot means joining the front ends of said arms to said manifold, further pivot means joining the rear ends of said arms to said header frame, and elevating means coupling at least one of said arms to said header frame.

3. Improved system according to claim 2 comprising a pair of arms projecting forward one from each end of the cutting platform, and further pivot means joining the front ends of said further arms to said manifold and the rear ends of said further arms to the header frame, said arms at each end being spaced one above the other.

4. Improved system according to either claim 1 or claim 2 wherein each said outlet tube terminates in a discharge spout having notches in its side walls arranged to discharge some air in a generally rearward direction having however a lateral component.

5. Improved system according to claim 1 wherein said manifold has at least one flat side which extends substantially vertically.

6. Improved system according to claim 1 wherein said manifold has a plurality of sleeves depending therefrom, the upper end of each said outlet tube being retained in a respective said sleeve.

7. Improved system according to claim 6 wherein each said sleeve contains a tapered thread which is threadably engaged by the upper end of a respective said outlet tube, each said outlet tube being oriented to provide an initial lateral component of movement.

8. Improved system according to claim 1 wherein the lower end of each said outlet tube terminates close to said cutter bar assembly.

9. Improved system according to claim 1 wherein said blower drive means is operable to drive said blower to provide an air pressure in said manifold of at least 300 mm water head.

10. Improved system according to claim 1 or claim 8 wherein said blower drive means is operable to drive said blower to provide an air pressure in said manifold of at least 400 mm water head.

* * * * *

United States Patent [19]

Mullins

[11] 4,406,113

[45] * Sep. 27, 1983

[54] MOBILE LAWN RAKE ATTACHMENT

[76] Inventor: Harvey L. Mullins, 9610 La Jolla Dr., Olivette, Mo. 63132

[*] Notice: The portion of the term of this patent subsequent to Jan. 26, 1999 has been disclaimed.

[21] Appl. No.: 317,173

[22] Filed: Nov. 2, 1981

Related U.S. Application Data

[63] Continuation-in-part of Ser. No. 156,395, Jun. 4, 1980, Pat. No. 4,312,095.

[51] Int. Cl.³ ............................................. A01D 7/00
[52] U.S. Cl. ............................... 56/400.16; 56/400.14
[58] Field of Search ........... 56/400.16, 400.14, 400.17, 56/400.18, 400.19, 400.13, 400.15, 384, 385, 386

[56] References Cited

U.S. PATENT DOCUMENTS

| | | | |
|---|---|---|---|
| 87,267 | 2/1869 | Knight et al. | 56/394 |
| 432,168 | 7/1890 | O'Neill et al. | 56/400.14 |
| 1,123,682 | 1/1915 | Carroll | 56/400.2 |
| 1,303,899 | 5/1919 | Hodgson | 56/394 |
| 1,647,064 | 10/1927 | Vance | 56/384 |
| 2,008,073 | 7/1935 | Huntley | 56/400.19 |
| 2,088,809 | 8/1937 | Peter | 56/384 |
| 2,207,488 | 7/1940 | Laemmer | 56/400.17 |
| 2,475,862 | 7/1949 | Tomkins | 56/400.17 |
| 2,645,891 | 7/1953 | Berkley | 56/386 |
| 2,648,946 | 8/1953 | Kelly | 56/385 |
| 2,767,545 | 10/1956 | Jenkins | 56/400.18 |
| 3,438,183 | 4/1969 | Puretie | 56/378 |
| 3,855,766 | 12/1974 | Lutz | 56/400.18 |
| 4,299,079 | 11/1981 | Lambert | 56/400.14 |
| 4,312,095 | 1/1982 | Mullins | 56/400.14 |

Primary Examiner—Paul J. Hirsch
Attorney, Agent, or Firm—Haverstock, Garrett & Roberts

[57] ABSTRACT

A mobile lawn rake attachment advantageous for use in conjunction with conventional riding mowers or other similar towing vehicles for providing a convenient method of raking large areas of accumulated grass clippings, leaves, and other associated lawn debris and effectively reducing the overall time required for such raking operations including a wheel frame assembly having a forwardly extending portion thereon for coupling to a conventional towing vehicle, a first rake tine assembly mounted for pivotal movement on a first tine carrying cross-bar member positioned on the forward portion of the wheel frame assembly, a second rake tine assembly mounted for pivotal movement on a second tine carrying cross-bar member positioned aft of the first rake tine assembly and disposed above the wheel frame assembly, the second rake tine assembly having three substantially identical overlapping tine sections which may be constructed in varying arrangements relative to each other including having the center tine section disposed aft of the two end tine sections positioned adjacent thereto, and a relatively simple linkage mechanism readily accessible from the seat of the towing vehicle for pivotally raising and lowering both rake tine assemblies between a ground engaging operative raking position and an elevated position angularly related thereto for delivering and dumping the accumulated debris gathered and retained therein. The present device may also include optional tine sections which may be easily and conveniently attached to the outermost tine portions of certain embodiments of the aft rake assembly for more efficiently gathering and retaining associated lawn debris within the rake assembly.

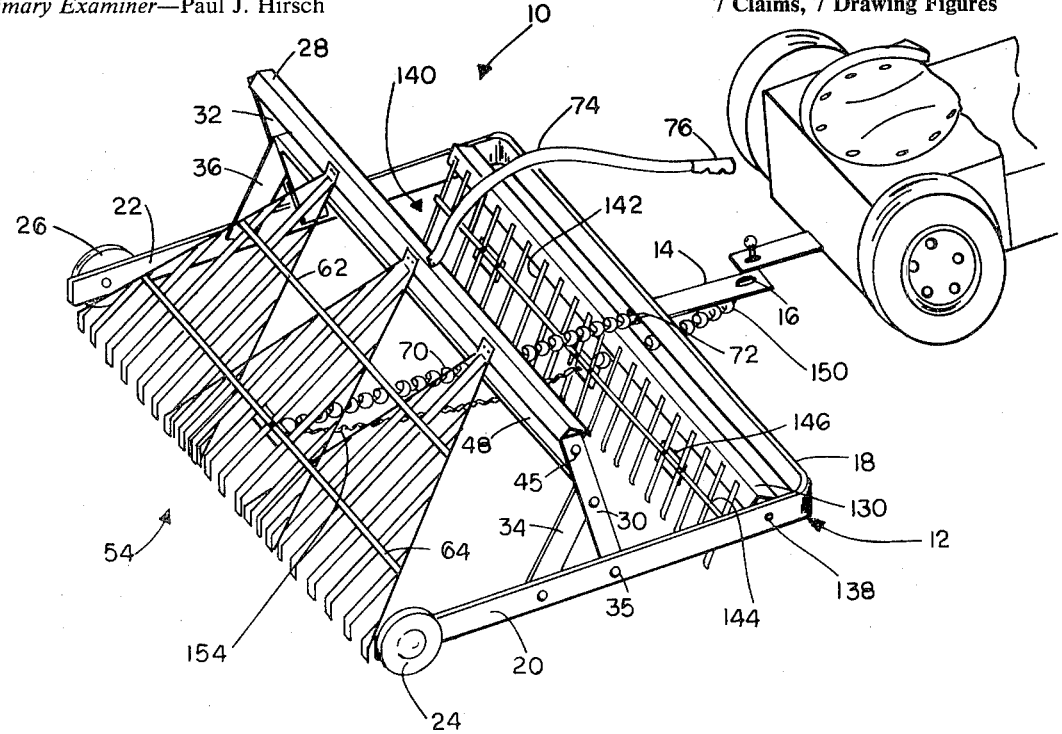

7 Claims, 7 Drawing Figures